United States Patent
Zhou et al.

(10) Patent No.: US 9,903,005 B2
(45) Date of Patent: Feb. 27, 2018

(54) METHOD AND DEVICE FOR DEPLETING COPPER SMELTING SLAG

(71) Applicant: YANGGU XIANGGUANG COPPER CO., LTD., Shandong (CN)

(72) Inventors: Songlin Zhou, Shandong (CN); Weidong Liu, Shandong (CN); Hu Wang, Shandong (CN)

(73) Assignee: YANGGU XIANGGUANG COPPER CO., LTD., Shifo Town, Shandong (CN)

( * ) Notice: Subject to any disclaimer, the term of this patent is extended or adjusted under 35 U.S.C. 154(b) by 300 days.

(21) Appl. No.: 14/649,800

(22) PCT Filed: May 21, 2014

(86) PCT No.: PCT/CN2014/077950
§ 371 (c)(1),
(2) Date: Jun. 4, 2015

(87) PCT Pub. No.: WO2015/010500
PCT Pub. Date: Jan. 29, 2015

(65) Prior Publication Data
US 2015/0307959 A1 Oct. 29, 2015

(30) Foreign Application Priority Data

Jul. 23, 2013 (CN) .......................... 2013 1 0311055

(51) Int. Cl.
*C22B 7/04* (2006.01)
*C22B 15/00* (2006.01)
(Continued)

(52) U.S. Cl.
CPC ............ *C22B 7/04* (2013.01); *C22B 15/0002* (2013.01); *C22B 15/0028* (2013.01);
(Continued)

(58) Field of Classification Search
CPC ... C22B 7/04; C22B 15/0028; C22B 15/0047; C22B 15/0054
See application file for complete search history.

(56) References Cited

U.S. PATENT DOCUMENTS 2,438,911 A 4/1945 Gronningsaeter
3,281,236 A 10/1966 Meissner
(Continued)

FOREIGN PATENT DOCUMENTS

AU 3278378 * 1/1978
AU 509 658 B2 5/1980
(Continued)

OTHER PUBLICATIONS

CN 101886154 A published Nov. 2010. Machine translation.*
(Continued)

*Primary Examiner* — George Wyszomierski
*Assistant Examiner* — Tima M McGuthry Banks
(74) *Attorney, Agent, or Firm* — Schwabe Williamson & Wyatt, PC

(57) ABSTRACT

A method and device for depleting copper smelting slag. The method comprises mixing copper smelting molten slag (1) with a reductant (2) and an inert gas (3) under pressure, and then depleting same. The device for depletion comprises a furnace body (4), which furnace body (4) is provided with a feed opening (413) and a slag discharge port (416), and gas nozzles (411) disposed on the side wall of the furnace body.

8 Claims, 1 Drawing Sheet

(51) Int. Cl.

| | |
|---|---|
| *F27B 3/02* | (2006.01) |
| *F27B 3/20* | (2006.01) |
| *F27D 3/00* | (2006.01) |
| *F27B 14/00* | (2006.01) |
| *F27D 7/02* | (2006.01) |
| *F27D 99/00* | (2010.01) |

(52) U.S. Cl.
CPC ...... *C22B 15/0047* (2013.01); *C22B 15/0054* (2013.01); *F27B 3/02* (2013.01); *F27B 3/205* (2013.01); *F27B 14/00* (2013.01); *F27D 3/00* (2013.01); *F27D 3/0033* (2013.01); *F27D 7/02* (2013.01); *F27D 99/0033* (2013.01); *F27B 2014/002* (2013.01); *F27B 2014/004* (2013.01); *Y02P 10/212* (2015.11)

(56) References Cited

U.S. PATENT DOCUMENTS

| | | | |
|---|---|---|---|
| 3,506,435 | A | 4/1970 | Themelis et al. |
| 3,857,701 | A | 12/1974 | Hunter et al. |
| 4,504,309 | A * | 3/1985 | Mackey ............... C22B 5/02 423/48 |
| 6,231,641 | B1 | 5/2001 | Utigard |
| 2010/0107820 | A1 | 5/2010 | Euston |
| 2010/0154595 | A1 | 6/2010 | Zhou |
| 2010/0242676 | A1 | 9/2010 | Roth |
| 2010/0242682 | A1 * | 9/2010 | Sasaki ................ C22B 5/12 75/586 |
| 2015/0322546 | A1 | 11/2015 | Zhou et al. |

FOREIGN PATENT DOCUMENTS

| | | | |
|---|---|---|---|
| CN | 1354262 | A | 6/2002 |
| CN | 101705360 | A | 5/2010 |
| CN | 101736112 | A | 6/2010 |
| CN | 101839631 | A | 9/2010 |
| CN | 101886154 | A * | 11/2010 |
| CN | 103014369 | A | 4/2013 |
| CN | 103334014 | A | 10/2013 |
| CN | 103388082 | A | 11/2013 |
| EP | 2 957 645 | A1 | 12/2015 |
| GB | 1 458 269 | A | 12/1976 |
| JP | S4829961 | B1 | 9/1973 |
| JP | 2016501315 | A | 1/2016 |
| RU | 1132550 | C | 9/1996 |
| RU | 2476611 | C2 | 2/2013 |
| SU | 1573963 | A1 | 7/1988 |

OTHER PUBLICATIONS

CN 101705360 A published May 2010. Machine translation.*
SU 1573963 machine translation, published Jul. 1988).*
CN 101705360 machine translation, published May 2010).*
Extended European Search Report for EP14830180.7 dated Feb. 13, 2017; 8 pages.
Chilean Application No. 2015-001670, filed Jun. 15, 2015; First Office Action dated May 24, 2017; 15 pages including English translation.
Russian Application No. 2015121634/02, filed May 21, 2014; Official Action of Substantive Examination dated Mar. 30, 2017; 13 pages including English translation.

\* cited by examiner

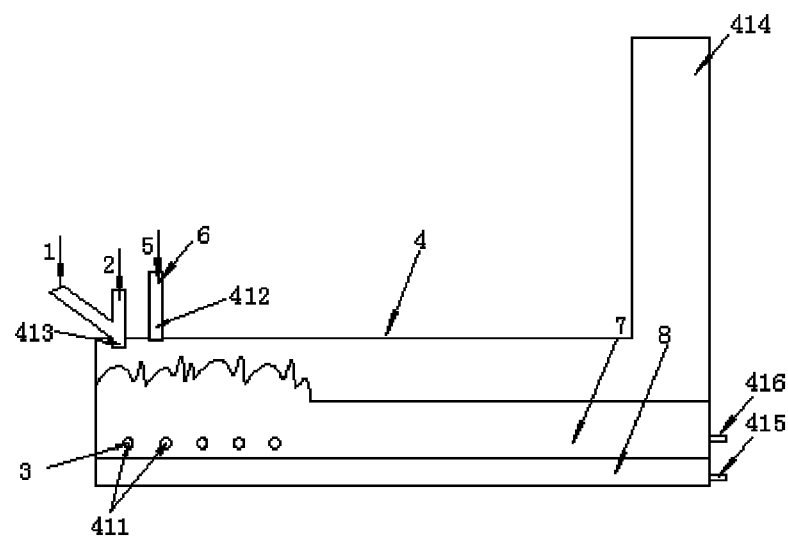

METHOD AND DEVICE FOR DEPLETING COPPER SMELTING SLAG

The present application is a U.S. National Phase of PCT/CN2014/077950, filed May 21, 2014 entitled "Method and Device for Depleting Copper Smelting Slag," which claims priority to Chinese patent application No. 201310311055.X filed with the SIPO on Jul. 23, 2013 entitled "Method for cleaning copper-smelting molten slag and cleaning device for cleaning of copper-smelting molten slag", which are incorporated herein by reference in their entirety.

FIELD OF THE INVENTION

The present invention relates to the technical field of nonferrous metallurgy, in particular, to a method for cleaning copper-smelting molten slag and a cleaning device for cleaning of copper-smelting molten slag.

BACKGROUND OF THE INVENTION

In copper pyrometallury industry, one method is producing blister copper indirectly from sulfide copper concentrate, which generally comprises two steps: first the sulfide copper concentrate is subjected to desulfurization and iron removal and smelting to obtain high-grade copper matte; and then the resulting copper matte is further subjected to desulfurization and iron removal and converting to give blister copper. Another method is producing blister copper directly from copper concentrate, which is adopted in practical production by Olympic Dam smeltery in Australia, Glogow smeltery in Poland, and KCM smeltery in Zambia. These methods have a common feature that the slag resulted from production contains $Cu_2O$ and $Fe_3O_4$ in a relatively large amount. In general, the slag contains 10% to 20% by weight of copper, and 30% to 50% by weight of $Fe_3O_4$.

Due to high copper content in slag, in all the above processes slag is treated by means of cleaning with electric furnace to decrease copper content in slag. During the cleaning with electric furnace, reducing agent is typically added to treat slag by reduction, and electric furnace could maintain temperature to guarantee thermodynamic foundation for reduction. However, cleaning with electric furnace merely provides thermodynamic foundation for reduction but leads to low reaction efficiency, such that the time for reducing $Cu_2O$ and $Fe_3O_4$ in slag is excessively long, i.e. the cleaning time is long, energy consumption is high, and the treated slag has a copper content of 1% to 4% by weight, i.e. the slag still has a relatively large copper content and needs to be subjected to further treatments like beneficiation before application. In this way, it causes the problem of relative high investment and production cost, and it is unfavorable for production.

SUMMARY OF THE INVENTION

In order to solve the above technical problem, the present invention provides a method for cleaning copper-smelting molten slag and a cleaning device for cleaning of copper-smelting molten slag. The method has high reaction efficiency for slag cleaning, could decrease copper content in the final slag and enables the slag to be applied without further treatment such as beneficiation. The present invention provides a method for cleaning copper-smelting molten slag, comprising the following steps:

in a cleaning device, mixing copper-smelting molten slag, a reducing agent and pressurized inert gas to perform cleaning thereby to obtain cleaned slag, wherein the inert gas has a pressure of 100 kPa to 800 kPa.

Preferably, the cleaning device comprises:

a furnace body, which comprises a molten pool inside and is provided therein with a gas nozzle, a feed port and a slag discharge port;

wherein the gas nozzle is disposed on the side wall of the furnace body and leads to the middle part of the molten pool.

Preferably, the copper-smelting molten slag and the reducing agent are introduced to the cleaning device via the feed port through a runner, respectively;

the inert gas is introduced to the cleaning device via the gas nozzle.

Preferably, the furnace body is provided with a fuel burner on the top; fuel and a combustion improver are introduced to the fuel burner.

Preferably, the combustion improver is industrial oxygen gas with an oxygen concentration of greater than 95% by weight.

Preferably, the inert gas is nitrogen gas.

Preferably, the copper-smelting molten slag is at a temperature of 1050° C. to 1350° C.

Preferably, the reducing agent is copper concentrate containing FeS and $Cu_2S$.

Preferably, a ratio by mass of the sulfur content in the reducing agent to the oxygen content in the copper-smelting molten slag is (0.6~1.5):1.

The present invention provides a cleaning device for cleaning of copper-smelting molten slag, comprising:

a furnace body, which comprises a molten pool inside and is provided therein with a gas nozzle, a feed port, and a slag discharge port; wherein the gas nozzle is disposed on the side wall of the furnace body and leads to the middle part of the molten pool.

In comparison with the prior art, the present invention introduces copper-smelting molten slag and a reducing agent to a cleaning device, introduces pressurized inert gas with a pressure of 100 kPa to 800 kPa to the cleaning device, mixes the materials and carries out cleaning to obtain cleaned slag. In the present invention, sensible heat of the copper-smelting molten slag is utilized to melt the reducing agent, and the $Cu_2O$ and $Fe_3O_4$ in slag are reduced by the reducing agent. The introduced inert gas agitates the reaction materials intensively, makes the molten slag boil, draws the reducing agent into the molten slag, and forces the $Cu_2O$ and $Fe_3O_4$ and the reducing agent to impact, aggregate and react interactively so as to form a slag phase. By intensive agitation with inert gas, the present invention promotes rapid refreshing of the reaction materials, intensifies the reaction progress, changes the nature of the slag rapidly, and meanwhile increases probability of collision and combination among molten copper droplets. Consequently, such intensified process in the present invention can reduce copper content in the final slag. The practice shows that by the present invention, copper content in the final slag is reduced to 0.35% by weight or less, $Fe_3O_4$ content is reduced to 4% by weight or less, and the cleaned slag, without further treatments such as beneficiation, can serve as a raw material for other industries after being directly granulated with a granulation process.

BRIEF DESCRIPTION OF THE DRAWINGS

FIG. 1 shows structural schematic diagram of the cleaning device for cleaning of copper-smelting molten slag that is provided in the embodiment of the present invention.

DETAILED DESCRIPTION OF THE INVENTION

For further understanding of the present invention, preferred embodiments of the present invention are depicted below in combination with examples, but it should be understood that the depiction is merely to further illustrate the features and merits of the present invention, rather than to limit the claims of the present invention.

The present invention provides a method for cleaning copper-smelting molten slag, comprising the following steps:

in a cleaning device, mixing copper-smelting molten slag, a reducing agent and pressurized inert gas followed by performing cleaning thereby to obtain cleaned slag, wherein the inert gas has a pressure of 100 kPa to 800 kPa.

To adapt to the development of metallurgy and overcome deficiencies of the prior art, the method for cleaning copper-smelting molten slag provided by the present invention is an improved method for slag cleaning, which could reduce copper content in the treated slag such that the final slag, without further treatments like beneficiation, can serve as a raw material for other industries after being granulated. Investment and production cost are relatively low.

In addition, copper matte is obtained while copper-smelting molten slag is cleaned, and it can be returned to the previous copper smelting procedure as a cold raw material.

In an embodiment of the present invention, copper-smelting molten slag and a reducing agent are introduced in a cleaning device, and pressurized inert gas at a pressure of 100 kPa to 800 kPa is charged to the cleaning device. The materials are then mixed to perform cleaning, thereby to obtain cleaned slag.

In the present invention, the copper-smelting molten slag is slag rich in Cu2O and Fe3O4 and in molten state, which is resulted from copper smelting process well known to those skilled in the art. In the present invention, there is no special limitation to components of the copper-smelting molten slag, where copper is in oxidized state and generally in an amount of 10% to 20% by weight, and Fe3O4 is generally in an amount of 30% to 50% by weight. The copper-smelting molten slag has sensible heat, and temperature thereof is preferably from 1050° C. to 1350° C. The present invention utilizes sensible heat of the copper-smelting molten slag to melt the reducing agent, and does not need to supplement additional heat to assist melting of the reducing agent, thereby achieving good energy-saving effect and saving economic cost.

In the present invention, a reducing agent is mixed with the copper-smelting molten slag to reduce the $Cu_2O$ and $Fe_3O_4$ in the slag such that the copper in the slag is enriched and settles at the bottom of the cleaning device and the upper layer slag is cleaned. There is no special limitation to the reducing agent in the present invention. Preferably, the reducing agent is copper concentrate containing FeS and $Cu_2S$, which involves low production cost and environment friendly. The copper concentrate containing FeS and $Cu_2S$ refer to the sulfide-containing copper concentrate employed in ordinary copper smelting process in the art, mainly being chalcopyrite. There is no special limitation to the source thereof in the present invention.

During a cleaning process according to an example of the present invention, FeS in the copper concentrate converts the copper oxide $Cu_2O$ carried in the raw slag to sulfide $Cu_2S$, the newly-generated $Cu_2S$ can combine with the $Cu_2S$ and FeS carried in the copper concentrate to form copper matte; at the same time the FeS in the copper concentrate reduces high valent oxide of iron, $Fe_3O_4$, in slag to low valent oxide FeO so as to change the property of slag. Namely, the iron compound carried in slag is converted from high-melting-point $Fe_3O_4$ to low-melting-point FeO. FeO further makes slag with $SiO_2$ carried in the slag to form 2 $FeO \cdot SiO_2$ which has a lower melting point, thereby changing properties of the final slag, reducing viscosity thereof, facilitating sedimentation and separation of copper matte, and decreasing copper content in upper-layer slag. The molten slag is proportionally mixed with copper concentrate, and a ratio by mass of sulfur content in the copper concentrate to oxygen content in the copper-smelting molten slag (S/O) is preferably (0.6-1.5):1, more preferably, (0.6-1.2):1.

In the present invention, the power for making molten slag boil and generating intensive agitating action is provided by introducing pressurized inert gas to the above reaction materials. In an example of the present invention, the introduced inert gas intensively agitates the reaction materials, makes the molten slag boil, and draws copper concentrate containing FeS and $Cu_2S$ into the molten slag, so as to force the $Cu_2O$, $Fe_3O_4$ and FeS to impact, aggregate and react interactively, thus promotes the generated small droplets of $Cu_2S$ and FeS to combine with each other so as to form copper matte and promotes the generated FeO to make slag with $SiO_2$, thereby forming separated slag phase and copper matte phase.

By intensive agitating with inert gas, the present invention promotes rapid updating of the reaction materials, intensifies the reaction progress, and changes property of the slag rapidly, and at the same time increases probability of collision and combination among the liquid droplets. Consequently, such intensified process in the present invention can reduce copper content in the final slag. In addition, agitating with inert gas can prevent the reducing agent and reduced $Cu_2S$ and FeO from being oxidized, with no increase in usage amount of the reducing agent, high efficiency and low cost.

In the present invention, the inert gas has a pressure of 100 kPa to 800 kPa, preferably 200 kPa to 600 kPa, and more preferably, 300 kPa to 500 kPa. The inert gas is preferably nitrogen gas, and it can increase contact among reaction materials and improve reaction efficiency. Moreover, nitrogen gas as an inert gas would not re-oxidize the reduced $Cu_2S$ and FeO, being beneficial to slag cleaning.

It is preferred in the present invention to introduce copper-smelting molten slag to a cleaning device, proportionally add a reducing agent and introduce pressurized inert gas to the cleaning device. In the present invention, the cleaning device is preferably a cleaning device described as follows.

The present invention provides a cleaning device for cleaning of copper-smelting molten slag, comprising:

a furnace body, which comprises a molten pool inside and is provided therein with a gas nozzle, a feed port, and a slag discharge port;

The gas nozzle is disposed on the side wall of the furnace body and leads to the middle part of the molten pool.

The cleaning device provided by the present invention is used in cleaning of copper-smelting molten slag, and is beneficial to decrease in copper content of the treated slag.

The cleaning device for cleaning of copper-smelting molten slag provided in examples of the present invention is a side-blown metallurgical furnace, whose structure is shown in FIG. 1. FIG. 1 shows structural schematic diagram of the cleaning device for cleaning of copper-smelting molten slag that is provided in the examples of the present invention.

In FIG. 1, 1 represents copper-smelting molten slag, 2 represents a reducing agent, 3 represents pressurized inert gas, 4 represents a furnace body, 411 represents a gas nozzle, 412 represents a fuel burner, 413 represents a feed port, 414 represents a rising flue, 415 represents a copper matte discharge port, 416 represents a slag discharge port, 5 represents fuel, 6 represents combustion improver, 7 represents a slag layer, and 8 represents a copper matte layer.

In the present invention, furnace body 4 comprises a molten pool where slag cleaning is conducted mainly. In an example of the present invention, furnace body 4 further comprises therein a rising flue 414 which is in communication with the molten pool. The $SO_2$-containing furnace gas generated in cleaning process is discharged through the rising flue 414, cooled, dedusted and then exhausted.

Furnace body 4 is provided thereon with a feed port 413 through which copper-smelting molten slag and reducing agent are added. Preferably, copper-smelting molten slag 1 and reducing agent 2 are introduced to the cleaning device via the feed port 413 through a runner, respectively.

Furnace body 4 is provided thereon with a gas nozzle 411, which is located on the side wall of the furnace body and leads to the middle part of the molten pool. The middle part of the molten pool refers to the position corresponding to the formed slag layer. The gas nozzle 411 may be located in one sidewall or two sidewalls of the furnace body 4. In the present invention, there may be one or more, preferably 5, gas nozzles in one sidewall.

In the present invention, inert gas 3 is preferably introduced to the production device via the gas nozzle 411. Since the gas nozzle 411 is disposed on the side wall of the furnace body 4 and can be immersed in the melt in the molten pool, i.e. the inert gas can be introduced to the slag layer, the introduced inert gas 3 can better provide the power for making molten slag boil and forming intensive agitation, without re-agitating the product into the slag, so it is beneficial to sedimentation and separation of the product, and is high in efficiency.

In an example of the present invention, furnace body 4 is provided on the top with a fuel burner 412 to which fuel 5 and combustion improver 6 are introduced. It is preferred in the present invention to combust fuel 5 in the fuel burner 412, and the generated heat can maintain thermal equilibrium of reduction reaction. Fuels commonly used in the art are employed. The combustion improver is preferably industrial oxygen gas with an oxygen concentration of greater than 95% by weight to ensure a relatively small amount of furnace gas, such that the heat carried away by furnace gas is small enough. There is no special limitation to amounts of the fuel and combustion improver in the present invention, as long as the total heat generated in combustion can maintain thermal equilibrium of the reduction reaction.

In the present invention, a slag discharge port 416 is arranged on the furnace body. In an example of the present invention, feed port 413 is located on top at one end of the furnace body 4, and reaction materials may be added proportionally and continuously. The slag discharge port 416 is located at lower part of the other end of the furnace body 4. Newly-generated slag is discharged continuously from the slag discharge port 416 and granulated to serve as a raw material for other industries.

In an example of the present invention, a copper matte discharge port 415 is arranged on the furnace body 4, and located at the bottommost part of the furnace body 4 and at the same end as the slag discharge port. Copper matte may be discharged from the copper matte discharge port 415 and granulated to serve as a raw material for production of blister copper.

There is no special limitation to materials and sizes of the furnace body, gas nozzle, and fuel burner in the present invention, and materials and sizes commonly used in the art are employed. Sizes of the feed port, slag discharge port, copper matte discharge port, molten pool and rising flue are technical content well known to those skilled in the art, and there is no special limitation to them in the present invention.

When slag cleaning is carried out according to an example of the present invention, copper-smelting molten slag 1 is introduced to the furnace body 4 via the feed port 413 through a runner at one end of the furnace body 4, copper concentrate 2 containing FeS and $Cu_2S$ is proportionally added via the feed port 413 through a runner, and pressurized inert gas 3 is continuously introduced via the gas nozzles 411 that are disposed in two sidewalls of the furnace body 4 and immersed in the melt in the molten pool, to make the molten slag boil and to draw the copper concentrate into the molten slag so as to form a mixture.

In the process, sensible heat of the slag renders the copper concentrate molten, and the FeS in the copper concentrate reduces $Cu_2O$ in slag to $Cu_2S$, and at the same time reduces $Fe_3O_4$ in slag to FeO. The introduced inert gas intensively agitates the reaction materials, forces the $Fe_3O_4$, $Cu_2O$ and FeS to impact, aggregate and react interactively, promotes the generated small droplets of $Cu_2S$ and FeS to combine with each other so as to form copper matte and promotes the generated FeO to make slag with $SiO_2$, thereby forming separated slag layer 7 and copper matte layer 8 in the furnace body 4.

In addition, according to an example of the present invention, fuel 5 and combustion improver 6 are introduced to the fuel burner 412 disposed on the top of the furnace body 4, and thermal equilibrium of the reduction reaction is maintained by combustion of the fuel 5 in the burner. The combustion improver 6 used for combustion of the fuel 5 is industrial oxygen gas with an oxygen concentration of greater than 95% by weight, to ensure a small amount of furnace gas, so as to guarantee heat carried away by furnace gas is small enough.

At the other end of the furnace body 4, copper matte in liquid phase is discharged from the copper matte discharge port 415 that is disposed at bottommost part, and the cleaned slag in liquid phase is discharged from the slag discharge port 416. Besides, the $SO_2$-containing furnace gas generated in the above process is discharged via the rising flue 414, cooled, dedusted, desulfurized and then exhausted.

Separated copper matte and cleaned slag are obtained after completion of the cleaning. According to testing standard in the art, the slag contains copper in an amount of 0.35% by weight or less, and it can serve as a raw material for other industries after being granulated. The copper matte contains copper in an amount of 45% to 65% by weight, and may be returned to the previous copper smelting procedure as a cold raw material after being granulated.

In summary, the method for cleaning copper-smelting molten slag provided in the present invention is high in reaction efficiency, and the tailing has low copper content. In addition, the method of the present invention not only is simple in process and convenient for control and operation, but also has the merits of small device, low energy consumption, less investment and suitability for generalization.

For further understanding of the present invention, the method for cleaning copper-smelting molten slag and cleaning device for cleaning of copper-smelting molten slag provided in the present invention are particularly described in combination with examples below.

The copper-smelting molten slag used in the following examples has a copper content of 20% and an oxygen content of 30%, and it is at a temperature of 1250° C. A ratio by mass of copper, sulfur and iron as three main components in copper concentrate is 1:1:1, and mass of the three main components accounts for 75% of total mass of the copper concentrate.

Example 1

In the cleaning device shown in FIG. 1, copper-smelting molten slag 1 was introduced to the furnace body 4 via the feed port 413 through a runner, copper concentrate 2 containing FeS and $Cu_2S$ was proportionally added via the feed port 413 through a runner, and pressurized nitrogen gas 3 was continuously introduced via the gas nozzles 411 that were disposed in two sidewalls of the furnace body 4 and immersed in the melt in the molten pool. The materials were mixed followed by slag cleaning. Separated slag layer 7 and copper matte layer 8 were formed in the furnace body 4.

The raw slag was treated at a rate of 100 t/h, copper concentrate was added at a rate of 20 t/h; the nitrogen gas was at a pressure of 100 kPa; and a ratio by mass of sulfur content in the copper concentrate to oxygen content in the copper-smelting molten slag (S/O) was (0.6-1.2):1.

Fuel 5 and industrial oxygen gas 6 were introduced to the fuel burner 412 disposed on the top of the furnace body 4, and thermal equilibrium of the reduction reaction was maintained by combustion of the fuel 5 in the burner.

The cleaned slag in liquid phase was discharged via the slag discharge port 416, and the copper matte at the lowest part was discharged from the copper matte discharge port 415. Besides, the $SO_2$-containing furnace gas generated in the above process was discharged via the rising flue 414, cooled, dedusted, desulfurized and then exhausted.

Separated copper matte and cleaned slag were obtained. According to testing standard in the art, the slag contains copper in an amount of 0.35% by weight, and the copper matte contains copper in an amount of 45% by weight.

Example 2

Cleaning of copper-smelting molten slag was carried out according to the method of example 1 with nitrogen gas at a pressure of 800 kPa and a ratio by mass of sulfur content in the copper concentrate to oxygen content in the copper-smelting molten slag (S/O) being (0.6-1.2):1, to obtain separated copper matte and cleaned slag.

After obtaining the separated copper matte and cleaned slag, according to testing standard in the art, the cleaned slag contains copper in an amount of 0.35% by weight, and the copper matte contains copper in an amount of 45% by weight.

From the above examples, it can be seen that the method for cleaning copper-smelting molten slag provided by the present invention can decrease copper content in the treated slag, such that the final slag, without further treatments such as beneficiation, can serve as a raw material for other industries after being granulated, therefore allowing low cost for investment and production. Moreover, copper matte can be obtained while cleaning copper-smelting molten slag according the present invention, and it may be returned to the previous copper smelting procedure as a cold raw material.

In addition, the method of the present invention has the merits of simple process and convenient control and operation, and is applicable to be generalized.

The above illustration with examples is merely to aid understanding of the method of the present invention and core idea thereof. It should be indicated that several improvements and modifications may be made by an ordinary artisan skilled in the art without deviation from the principle of the present invention, and such improvements and modifications all fall within the protection scope covered by the claims of the present invention.

What is claimed is:

1. A method for cleaning copper-smelting molten slag, comprising the following steps:
   in a cleaning device, mixing copper-smelting molten slag, a reducing agent and pressurized inert gas to perform cleaning thereby to obtain cleaned slag, wherein the inert gas has a pressure of 100 kPa to 800 kPa;
   wherein the reducing agent is copper concentrate containing FeS and $Cu_2S$.

2. The method according to claim 1, wherein the cleaning device comprises:
   a furnace body, the furnace body comprises a molten pool inside and is provided therein with a gas nozzle, a feed port and a slag discharge port;
   wherein the gas nozzle is disposed on the side wall of the furnace body and leads to the middle part of the molten pool.

3. The method according to claim 2, wherein the copper-smelting molten slag and reducing agent are introduced to the cleaning device via the feed port through a runner, respectively;
   the inert gas is introduced to the cleaning device via the gas nozzle.

4. The method according to claim 3, wherein the furnace body is provided with a fuel burner on the top;
   fuel and combustion improver are introduced to the fuel burner.

5. The method according to claim 4, wherein the combustion improver is industrial oxygen gas with an oxygen concentration of greater than 95% by weight.

6. The method according to claim 1, wherein the inert gas is nitrogen gas.

7. The method according to claim 1, wherein the copper-smelting molten slag is at a temperature of 1050° C. to 1350° C.

8. The method according to claim 1, wherein a ratio by mass of sulfur content in the reducing agent to oxygen content in the copper-smelting molten slag is (0.6-1.5):1.

* * * * *